United States Patent
Sandstrom

[19]

[11] Patent Number: 5,972,461
[45] Date of Patent: Oct. 26, 1999

[54] REWRITABLE OPTICAL DATA STORAGE DISK HAVING ENHANCED FLATNESS

[75] Inventor: Chad R. Sandstrom, Stillwater, Minn.

[73] Assignee: Imation Corp., Oakdale, Minn.

[21] Appl. No.: 09/003,580

[22] Filed: Jan. 6, 1998

[51] Int. Cl.[6] ........................................ G11B 5/66
[52] U.S. Cl. ................ 428/64.3; 428/64.4; 428/64.7; 428/336; 428/694 ML; 428/694 RL; 428/694 ST; 428/694 SL; 428/900; 427/128; 427/129; 427/131
[58] Field of Search .................. 428/694 ML, 694 RL, 428/694 ST, 694 SL, 336, 900, 64.3, 64.4, 64.7; 427/128, 129, 131

[56] References Cited

U.S. PATENT DOCUMENTS

| | | | |
|---|---|---|---|
| 4,664,964 | 5/1987 | Okita | 428/143 |
| 4,741,967 | 5/1988 | Yoshihara et al. | 428/469 |
| 5,032,470 | 7/1991 | Shindo et al. | 428/694 MT |
| 5,125,750 | 6/1992 | Corle et al. | 359/819 |
| 5,158,834 | 10/1992 | Funkanbusch | 428/694 RE |
| 5,470,627 | 11/1995 | Lee et al. | 428/64.4 |
| 5,541,910 | 7/1996 | Tanaka et al. | 369/290 |
| 5,576,087 | 11/1996 | Watanabe et al. | 428/141 |
| 5,576,102 | 11/1996 | Kisaka et al. | 428/336 |
| 5,593,790 | 1/1997 | Dubnar | 428/694 ML |
| 5,598,399 | 1/1997 | Oglhara et al. | 369/275.2 |
| 5,620,792 | 4/1997 | Challener, IV | 428/332 |
| 5,665,468 | 9/1997 | Sekiya et al. | 428/332 |
| 5,667,887 | 9/1997 | Miyazawa et al. | 428/332 |
| 5,695,866 | 12/1997 | Watanabe et al. | 428/216 |
| 5,700,565 | 12/1997 | Kitaguchi | 428/332 |
| 5,777,953 | 7/1998 | Hirokane | 369/13 |

FOREIGN PATENT DOCUMENTS

| | | |
|---|---|---|
| 56-169238 | 12/1981 | Japan. |
| 218732 | 9/1985 | Japan. |

*Primary Examiner*—Leszek Kiliman
*Attorney, Agent, or Firm*—Eric D. Levinson

[57] ABSTRACT

A rewritable optical recording disk has a substrate with an increased thickness that is greater than or equal to approximately 1.5 mm and less than or equal to approximately 2.5 mm. The increased thickness of the substrate enhances the flatness of the recording disk relative to a recording plane. In particular, the increased thickness reduces process-induced surface variations such as warpage and tilt, and provides the disk with increased stiffness to resist deflection during use. The enhanced flatness enables data to be recorded on the disk in a consistent manner with greater spatial densities using techniques such as near-field, air-incident recording. The resulting disk thereby yields greater spatial density and data storage capacity.

31 Claims, 3 Drawing Sheets

- Sample 1
- Sample 2
- Sample 3
- Sample 4
- Sample 5

Fig. 5

Mold Temp. (deg.C)
- 120
- 100
- 80

REWRITABLE OPTICAL DATA STORAGE DISK HAVING ENHANCED FLATNESS

TECHNICAL FIELD

The present invention relates to rewritable optical data storage media including magneto-optic disks useful in near-field, air-incident recording applications.

BACKGROUND INFORMATION

In magneto-optic recording, data is represented as a magnetized domain on a magnetizable recording medium such as a disk. Each domain is a stable magnetizable data site representative of a data bit. Data is written to the medium by applying a focused beam of high intensity light in the presence of a magnetic field. The disk typically includes a substrate, a magneto-optic recording layer, a reflective layer, and two or more dielectric layers.

In substrate-incident recording, the beam passes through the substrate before it reaches the recording layer. The reflective layer in a substrate-incident recording medium is formed on a side of the recording layer opposite the substrate. The reflective layer reflects the beam back to the recording layer, increasing overall exposure and absorption.

In near-field, air-incident recording, the beam does not pass through the substrate. Instead, the beam is incident on the recording layer from a side of the disk opposite the substrate. In an air-incident recording medium, the reflective layer is formed adjacent the substrate. A solid immersion lens (SIL) can be used to transmit the beam across an extremely thin air gap, and through the top of the recording medium to the recording layer. The SIL can be integrated with a flying magnetic head assembly. The air gap forms a bearing over which the flying head rides during operation. For near-field recording, the thickness of the air gap is less than one wavelength of the recording beam. Transmission of the beam is accomplished by a technique known as evanescent coupling.

For either substrate-incident or air-incident recording, the recording beam heats a localized area of the recording medium above its Curie temperature to form a magnetizable domain. The domain is allowed to cool in the presence of a magnetic field. The magnetic field overcomes the demagnetizing field of the perpendicular anisotropy recording medium, causing the localized domain to acquire a particular magnetization. The direction of the magnetic field and the resulting magnetization determine the data represented at the domain.

With beam modulation recording techniques, the magnetic field is maintained in a given direction for a period of time as the beam power is selectively modulated across the recording medium to achieve desired magnetizations at particular domains. According to magnetic field modulation (MFM) recording techniques, the beam is continuously scanned across the recording medium while the magnetic field is selectively modulated to achieve desired magnetization. Alternatively, the beam can be pulsed at a high frequency in coordination with modulation of the magnetic field.

To read the recorded data, the drive applies a lower intensity, plane-polarized read beam to the recording medium. Upon transmission through and/or reflection from the recording medium, the plane-polarized read beam experiences a Kerr rotation in polarization. The Kerr angle of rotation varies as a function of the magnetization of the localized area. An optical detector receives the read beam and translates the Kerr rotation angle into an appropriate bit value.

The amount of data storage capacity for a given magneto-optic disk depends on the spatial density of domains on the disk and the effective recording surface area of the disk. Greater spatial density results in more data per unit surface area. Greater recording surface area naturally results in greater storage capacity for a given spatial density. Recording surface area is limited, however, by disk size. Disk size has been limited in part by drive footprint requirements. Spatial density is limited primarily by the spot size of the drive laser. In other words, spatial density is a function of the ability of the drive to direct a beam to increasingly smaller domains in a consistent manner. Near-field, air-incident recording, in particular, has the potential to produce extremely small spot sizes using evanescent coupling and the resultant high numerical aperture, thereby providing increased spatial density and data storage capacity.

SUMMARY

The present invention is directed to a rewritable optical data storage disk having a substrate with an increased thickness that is greater than or equal to approximately 1.5 mm. The increased thickness of the substrate enhances the flatness of the recording disk relative to a recording plane. In particular, the increased thickness reduces process-induced surface variations such as warpage and tilt, and provides the disk with increased stiffness to resist deflection during use. The enhanced flatness enables data to be recorded on the disk in a consistent manner with greater spatial densities using techniques such as near-field, air-incident recording. The resulting disk thereby yields greater spatial density and data storage capacity.

Flatness refers to the ability of the incident surface of the disk to maintain a substantially constant position relative to a recording plane on which the drive laser beam is focused. The "incident" surface refers to the surface of the disk through which the beam enters the disk. Deviation of the disk surface from the recording plane can impact the ability of the drive laser to focus on individual domains, particularly for higher spatial densities. This deviation is compounded by the fact that the disk is constantly spinning during use in a drive. In near-field applications, for example, it is expected that drives may rotate a disk at speeds on the order of 2400 to 3600 revolutions per minute (rpm). Consequently, the portion of the disk to which the recording head is directed is constantly and rapidly changing.

For near-field, air-incident recording, the size and focal plane of a recording spot is determined primarily by the thickness of the air bearing that separates the recording head and the disk surface. If the position of the disk surface is not uniform, the air bearing thickness can vary. Variation in the air bearing thickness can result in varying focus and spot size across the disk. In particular, the thickness of the air gap determines the amount of radiation received by the recording layer via evanescent coupling. Significant variation in spot size and focus can undermine the ability of the laser to consistently address extremely small domains. Also, excessive surface nonuniformity in the disk can cause acute changes in air bearing thickness for successive domains and resultant loss of tracking. In extreme cases, head crashes, i.e., physical contact of the head with the disk, can result. Thus, unacceptable flatness can lead to disk drive failure.

The surface of the disk can deviate from the recording plane for a number of reasons. The disk fabrication process, for example, can produce warpage and tilt in the disk. With thinner substrates, in particular, the effects of gravity and thermal gradients during the post-mold cooling phase can cause uneven densification and unbalanced thermal stresses at different areas of the disks. For example, portions of the disk closest to the mold surface will cool more quickly. The result is disk warpage and tilt.

According to its ordinary meaning, warpage refers to a curvature of the surface of the disk. For a warped disk, tilt can vary with both radial and angular position. Tilt refers to variation of the disk surface flatness relative to an ideal disk plane, and is represented by the following equation:

$$T=(\partial z/\partial r)\hat{i}+(\partial z/r\partial \theta)\hat{j},$$

where r is the radial position of the disk at which tilt is to be measured, z is the variation of the disk in a direction normal to the ideal surface plane as represented as a function $f(r,\theta)$, and $\theta$ is the angular position of the disk at which tilt is to be measured. Thus, warpage and tilt are terms that generally can be used to characterize a deviation of the disk from an ideal disk plane.

In addition to the static variations caused by fabrication, disks having thinner substrates also are susceptible to deflection in response to forces encountered during drive operation. Such forces may result, for example, from inadvertent contact of the head with the disk surface or vibration induced by rotation of the disk. Head crashes can result, in particular, from the application of shock loads when the disk and drive system are bumped or dropped. Also, for flight during operation, the head exerts pressure against the air bearing. This bearing pressure is transferred to the disk, potentially causing deflection.

Deflection generally varies across the surface area of the disk. In particular, deflection during use can be more pronounced at the outer diameter of the disk. The disk is held in a relatively fixed manner by a clutch mechanism associated with the drive. The disk is rotated by a spindle motor associated with the clutch mechanism. The radii of the disk plane form beam members relative to the fixed center of the disk. Each beam member undergoes greater deflection at the outer diameter than at the inner diameter of the disk. Thus, deviation of the disk surface from the recording plane due to deflection can progressively increase from the inner diameter outward. In any event, the disk surface may not conform closely to the recording plane as it is rotated.

Conventional spatial densities of optical disks ordinarily tolerate some degree of focusing error, and therefore are not greatly impacted by flatness variation. Also, to the extent that focusing error is a problem, conventional substrate-incident recording drives typically include closed-loop focus adjustment across the surface of the disk. At higher spatial densities, however, surface deviation can impair the ability of the drive laser to consistently write and read to and from individual domains on the disk. With newer recording techniques such as near-field, air-incident recording, a single disk can potentially bear up to 20 gigabytes (GB) of data over the area of a disk having a diameter in the range of 120 to 135 mm. In this case, the disk must be capable of providing stable magnetized domains on the order of 0.05 to 0.06 square microns per domain.

Higher spatial densities may allow very little if any tolerance for focusing error induced by flatness variation. Moreover, the evanescent coupling technique used in near-field, air-incident recording does not allow ready focus adjustment. Rather, the air bearing thickness is the predominant factor in determining the spot size and focal plane of the beam. With significant disk warpage, tilt, and/or deflection, the air bearing thickness can vary to an undesirable degree. As a result, the near-field recording head may suffer from focusing error and/or tracking loss. Accordingly, flatness is a critical condition in a high density recording system such as a near field recording system.

In accordance with the disk of the present invention, the increased thickness of the substrate provides significantly enhanced flatness by increasing the rigidity and weight of the disk. The increased rigidity enables the disk to effectively resist deflection during disk drive operation. The increased weight and resulting gravity of the disk also counteract forces that would otherwise cause significant warpage and tilt during fabrication. Substrate thicknesses that are greater than or equal to approximately 1.5 millimeters (mm) provide the rigidity and weight necessary to achieve desired flatness across the surface area of the disk, i.e., from inner to outer diameter.

Substrate thicknesses that are greater than approximately 2.5 mm provide the necessary rigidity and weight, but can increase the cost and time involved in the fabrication process. Disk and drive material cost and excessive post-mold cooling time make substrate thicknesses of less than or equal to 2.5 mm more desirable. Substrate thicknesses greater than 2.5 mm can result in a heavier disk, requiring greater power consumption and higher rated drive motors to rotate the disk. For a given motor, the heavier disk produces excessive inertia and momentum, slowing spin-up and spin-down time and increasing data access time.

Therefore, it is desirable that the substrate have a thickness that is greater than or equal to approximately 1.5 mm and less than or equal to approximately 2.5 mm. More particularly, for a disk having a diameter in the range of approximately 120 to 135 mm, the substrate preferably has a thickness of greater than or equal to approximately 1.8 mm and less than or equal to approximately 2.2. A substrate having a thickness of greater than or equal to approximately 1.9 and less than or equal to approximately 2.1 mm is even more desirable, with a substrate thickness of approximately 2 mm being considered optimum given the performance and manufacturing factors considered.

As broadly embodied and described herein, the present invention provides a rewritable optical data storage disk comprising a substrate and a recording layer, wherein the substrate has a thickness of greater than or equal to approximately 1.5 mm.

In another embodiment, the present invention provides an air-incident magneto-optic disk comprising in order a substrate, a reflective layer, a first dielectric layer, a recording layer, and a second dielectric layer, wherein the substrate has a thickness of greater than or equal to approximately 1.5 mm.

In a third embodiment, the present invention provides a system for air-incident, magneto-optic recording, the system comprising a magneto-optic disk having a substrate and a recording layer, a radiation source oriented to direct a beam of radiation to the magneto-optic recording layer from a side of the recording medium opposite the substrate, and a detector oriented to receive a reflected component of the beam of radiation and generate a data signal based on the content of the beam of radiation, wherein the substrate has a thickness of greater than or equal to approximately 1.5 mm.

In a fourth embodiment, the present invention provides a method for making an air-incident, magneto-optic disk comprising forming a substrate having a thickness of greater than or equal to approximately 1.5 mm, forming a reflective layer over the substrate, forming a first dielectric layer over the reflective layer, forming a recording layer over the first dielectric layer, and forming a second dielectric layer over the recording layer.

Other advantages, features, and embodiments of the present invention will become apparent from the following detailed description and claims.

DETAILED DESCRIPTION

Figure 1:
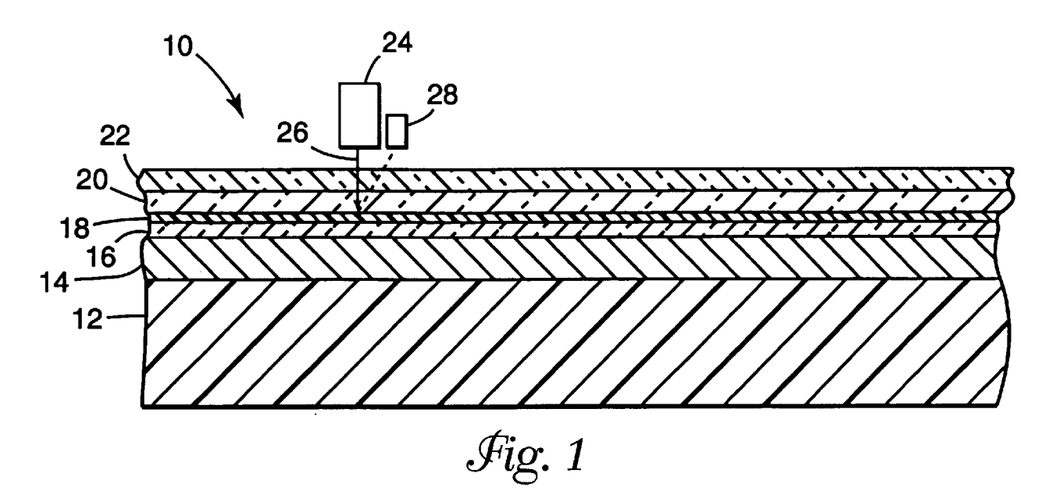
FIG. 1 is a cross-sectional diagram of a magneto-optic recording disk having a substrate with increased thickness.

FIG. 1 is a cross-sectional diagram of a rewritable optical data storage disk 10 having a substrate 12 with an increased thickness, in accordance with an embodiment of the present invention. Disk 10 may be, for example, a magneto-optic recording disk. In the example of FIG. 1, disk 10 is configured for air-incident recording applications and includes, in order, substrate 12, a reflective layer 14, a first dielectric layer 16, a recording layer 18, a second dielectric layer 20, and a third dielectric layer 22. FIG. 1 is provided for purposes of illustration and is not drawn to scale. Dielectric layers 16, 20 encapsulate recording layer 18 and protect it against reactants. Dielectric layer 22 may be desirable to optically tune disk 10 and is optional. Also, reflective layer 14 optionally is included for enhanced optical and thermal response.

Figure 2:
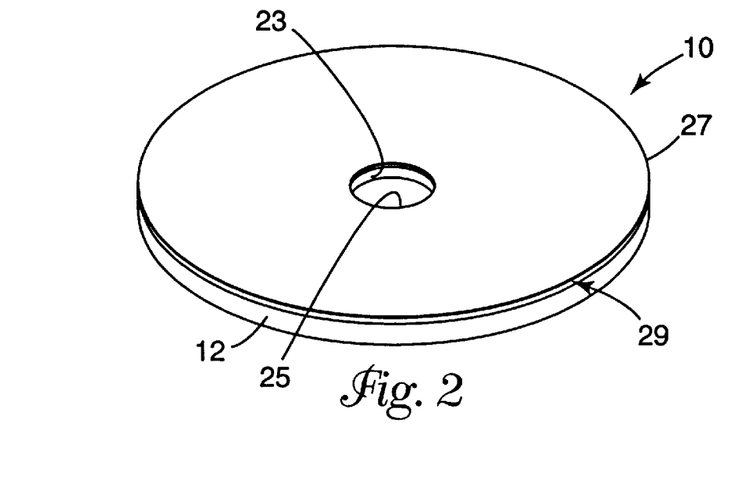
FIG. 2 is a top perspective view of the magneto-optic recording disk of FIG. 1.

FIG. 2 is a top perspective view of disk 10. As shown in FIG. 2, disk 10 is circular and has an inner diameter 23 defined by a center hole 25, and an outer diameter 27 defined by the circumference of the disk. In FIG. 2, reference numeral 29 generally designates the various layers 14, 16, 18, 20, 22 formed over substrate 12. Disk 10 can be configured for a fixed disk drive system, but preferably is removable to facilitate the use of multiple disks with a single drive and disk portability to other drives. For removable use, disk 10 may be housed in a cartridge. Center hole 25 may accommodate a hub or other mechanism for coupling disk 10 to a clutch and spindle motor associated with a drive. The hub may extend through the cartridge. The diameter of circular center hole 25 may be on the order of 15 mm.

Substrate 12, in accordance with the present invention, has a thickness of greater than or equal to approximately 1.5 mm. Substrate 12 preferably has a thickness of greater than or equal to approximately 1.5 mm and less than or equal to approximately 2.5 mm. More particularly, substrate 12 preferably has a thickness of greater than or equal to approximately 1.8 mm and less than or equal to approximately 2.2 mm and, more preferably, a thickness of greater than or equal to approximately 1.9 mm and less than or equal to approximately 2.1 mm. In one particular embodiment, substrate 12 may have a thickness of approximately 2 mm for optimum performance and ease of use and fabrication. The diameter of disk 10 preferably is greater than or equal to approximately 120 mm and less than or equal to approximately 135 mm. More preferably, disk 10 has a diameter of approximately 130 mm for desired flatness in combination with the thickness dimension of substrate 12.

With a disk having a diameter of 120 mm to 135 mm, the increased thickness of substrate 12 has been observed to provide enhanced flatness over a range of operating conditions. Substrate 12 provides disk 10 with increased stiffness to resist deflection in response to forces encountered during drive operation. Also, the increased thickness of substrate 12 allows disk 10 to resist warpage and tilt that otherwise could result during fabrication due to gravity and processing-induced thermal gradients. The result of the enhanced flatness afforded by substrate 12 is a disk 10 that yields greater spatial density and data storage capacity. In an air-incident, near field recording application, the increased thickness of substrate 12 reduces deviation of the plane of disk 10 from an ideal recording plane on which a beam emitted by a drive head is focused. In this manner, substrate 12 enables the air gap between disk 10 and the head to maintain a more constant thickness for consistent focus and spot size. Substrate 12 also enables enhanced drive reliability by reducing the susceptibility of disk 10 to head crashes.

With further reference to FIG. 1, disk 10 may form part of a near-field, air-incident recording system for magneto-optic data storage. Such a system may include an integrated magnetic head assembly 24 that emits a recording beam 26. The head assembly is oriented to direct beam 26 to recording layer 18 as disk 10 is rotated by a spindle motor at speeds on the order of 2400 to 3600 revolutions per minute. Recording beam 26 heats disk 10 at particular domains in the presence of a magnetic field applied by magnetic head assembly 24. The near-field recording technique makes use of evanescent coupling to direct beam 26 to recording layer 18. The beam can be transmitted, for example, by a solid immersion lens (SIL). An example of a system having a SIL for near-field, air-incident recording of magneto-optic disks is disclosed in U.S. Pat. No. 5,125,750 to Cole et al. The magnetic head assembly 24 can be structurally integrated along with the SIL to form a so-called "flying head."

Recording beam 26 is air-incident in the sense that it does not pass through substrate 12 to reach recording layer 18. Rather, recording beam 26 is incident on recording layer 18 via the air bearing that separates disk 10 from the flying head. The air gap is extremely thin, having a thickness that ordinarily is less than one wavelength of recording beam 26. Beam 26 also may pass through one or more dielectric layers 20, 22 before reaching recording layer 18. As also shown in FIG. 1, readout can be achieved by application of beam 26 to recording layer 18 at a lower intensity. A detector 28 is oriented to receive a reflected component of the read beam. Detector 28 translates the Kerr rotation angle of the reflected component to an appropriate bit value. This detector 28 also may be structurally integrated with the flying head.

The enhanced flatness of disk 10 allows improved conformance of the surface of the disk to the recording plane. In particular, the reduced susceptibility of disk 10 to warpage and tilt, along with improved stiffness for resistance to deflection, allows the air gap between the flying head and the disk to remain substantially constant, at least relative to applicable system tolerances. As a result, the position of head assembly 24 can be readily tuned to produce a desired air gap thickness in a consistent manner. Specifically, the enhanced flatness of disk 10 enables head assembly 24 to be positioned at a substantially constant distance across the entire surface plane of disk 10 without regard to radial position.

In an air-incident construction, the optical characteristics of substrate 12 are largely irrelevant. Specifically, because the beam does not enter disk 10 through substrate 12, the optical properties of the substrate have no direct optical effect on performance. In contrast, substrate-incident disks typically require substrates having particular optical properties. Thus, in an air-incident disk, it is conceivable that a wider array of materials may be used to fabricate substrate 12. Also, such materials could be less expensive than higher grade optical materials. For example, substrate 12 can be formed from a variety of materials including thermosets, thermoplastics, metal, or glass. The selected materials can be transparent or opaque. Also, such materials could be selected in part on the basis of the applicable elastic modulus of the material for enhanced rigidity relative to more typical substrate materials for optical disks. For optical recording, however, it is typically desirable to form a physical format on substrate 12 to facilitate optical tracking. Therefore, it may be most desirable to form substrate 12 from a material that can be readily replicated with a physical format in a mold.

An example of a particular material that is readily embossable is the high-flow polycarbonate typically used for CD production. Although polycarbonate in general is a very widely used engineering thermoplastic, this particular class of polycarbonate has been developed for the optical disk market. The ready availability and price of this class of polycarbonate make it attractive for use in substrate 12. This polycarbonate material also provides a number of structural and manufacturing advantages. For example, high-flow polycarbonate has a sufficiently low viscosity to fill the mold without forming flow marks often associated with injection molded products. With an elastic modulus on the order of 345,000 pounds per square inch (psi), this class of polycarbonate is not generally among the stiffest of engineering thermoplastics, but is rigid enough to provide disk 10 with the desired flatness characteristic for substrate thicknesses contemplated in accordance with the present invention. In addition to sufficient rigidity, water uptake in high-flow polycarbonate is relatively low, avoiding significant deformation or environmental degradation problems due to water absorption. Also, this material exhibits a strain-at-failure of over 100 percent, indicating that the material is highly ductile. This characteristic is important for a nano-replicated plastic surface that will be used in an optical disk drive to guide a sub-micron sized laser spot to data on disk 10. Given its acceptable performance over an array of requirements, the high-flow polycarbonate typically used for optical disk substrates provides a suitable material for fabrication of substrate 12.

Substrate 12 preferably is formed as a single, integrally formed piece, but could be constructed from two or more layers bonded together by, for example, adhesive bonding or lamination. For example, two polycarbonate substrates produced from conventional 1.2 mm MO substrate molds could be bonded together to provide a 2.4 mm substrate. To reduce the time and complexity of fabrication, however, such a polycarbonate substrate preferably is integrally formed from a single mold as a single, non-layered substrate. The other layers 14, 16, 18, 20, 22 can then be formed over the resulting substrate 12.

Recording layer 18 may comprise a rare earth transition metal alloy such as FeTbCo or FeTbCoTa. Dielectric layers 16, 20, 22 can be formed from any of a variety of dielectric materials including silicon carbide, silicon nitride, and silicon dioxide. In particular, dielectric layers 16, 20 may comprise silicon carbide for enhanced passivation of recording layer 18, whereas dielectric layer 22 may comprise silicon nitride for desired optical response. Finally, reflective layer 14 may comprise a highly reflective metal such as aluminum chrome alloy. Such a material provides both effective reflectivity and thermal conductivity.

For example, reflective layer 14 may be formed from a layer of aluminum chrome alloy (4 weight % chromium in aluminum) having a thickness in a range of less than or equal to approximately 130 nm and greater than or equal to approximately 20 nm, and preferably less than or equal to approximately 60 nm and greater than or equal to approximately 30 nm. The thickness of recording layer 18 preferably is less than or equal to approximately 15 nm. In particular, the thickness of recording layer 18 may be in a range of less than or equal to approximately 15 nm and greater than or equal to approximately 6 nm, and preferably is in a range of less than or equal to approximately 12 nm and greater than or equal to approximately 8 nm. Recording layer 18, in this exemplary embodiment, may be formed from an FeTbCoTa material. In particular, recording layer 18 may having a composition, in atomic weight, of approximately 67% Fe, 23.5% Tb, 8.0% Co, and 1.5% Ta.

First dielectric layer 16 may have a thickness in a range of less than or equal to approximately 60 nm and greater than or equal to approximately 5 nm, and preferably is in a range of less than or equal to approximately 30 nm and greater than or equal to approximately 5 nm. Second dielectric layer 20 may have a thickness in a range of less than or equal to approximately 30 nm and greater than or equal to approximately 5 nm, and preferably is greater than or equal to approximately 20 nm. In this example, first and second dielectric layers 16, 20 may be formed from a silicon carbide-graphite material marketed under the tradename Hexoloy SG and commercially available from Carborundum, Inc., Amherst, N.Y., U.S.A. The composition of the "Hexoloy SG" silicon carbide compound has a spectrum indicating the presence of carbon, boron, silicon, nitrogen, and oxygen in detectable concentrations. Using the peak intensities and standard sensitivity factors known in the art, the atomic concentration of this silicon carbide ($SiC_x$) dielectric is estimated as Si(35%)C(51%)B(7%)N(5%)O (2%) which yields a value of x=0.51/0.35=1.47. Third dielectric layer 22 may have a thickness in a range of less than or equal to approximately 200 nm and greater than or equal to approximately 5 nm, and preferably less than or equal to approximately 50 nm and greater than or equal to approximately 20 nm. Third dielectric layer 22 may be formed from a silicon nitride material. In this example, the silicon nitride may be $Si_3N_4$.

According to this embodiment, disk 10 incorporates a substrate 12 having a thickness in the range of 1.5 to 2.5 mm, as described herein, while also incorporating an extremely thin MO recording layer on the order of 6 to 15 nm in thickness. The combination of theses features provides a disk 10 having both enhanced flatness characteristics and a reduced demagnetizing field threshold. The flatness characteristic is particularly applicable to disk diameters in the range of greater than or equal to approximately 120 mm and less than or equal to approximately 135 mm. The reduced demagnetizing field threshold is useful with recording techniques, such as magnetic field modulation, that use lower magnetic fields. A disk constructed with the above materials and dimensions has been observed as capable of providing stable magnetized domains on the order of 0.0525 square microns per domain.

Disk 10 preferably is constructed for air-incident recording. Disk 10 could be adapted for substrate-incident recording, however, by selecting the order in which the various layers are deposited. In particular, for substrate-incident recording, disk 10 could include, in order, substrate 12, a first dielectric layer, a recording layer, a second dielectric layer, and a reflective layer. Such a substrate-incident disk would benefit from the enhanced flatness afforded by the thickness of substrate 12. At the same time, however, the increased thickness of substrate 12 could cause beam focusing and attenuation problems for existing laser diode sources.

Figure 3:
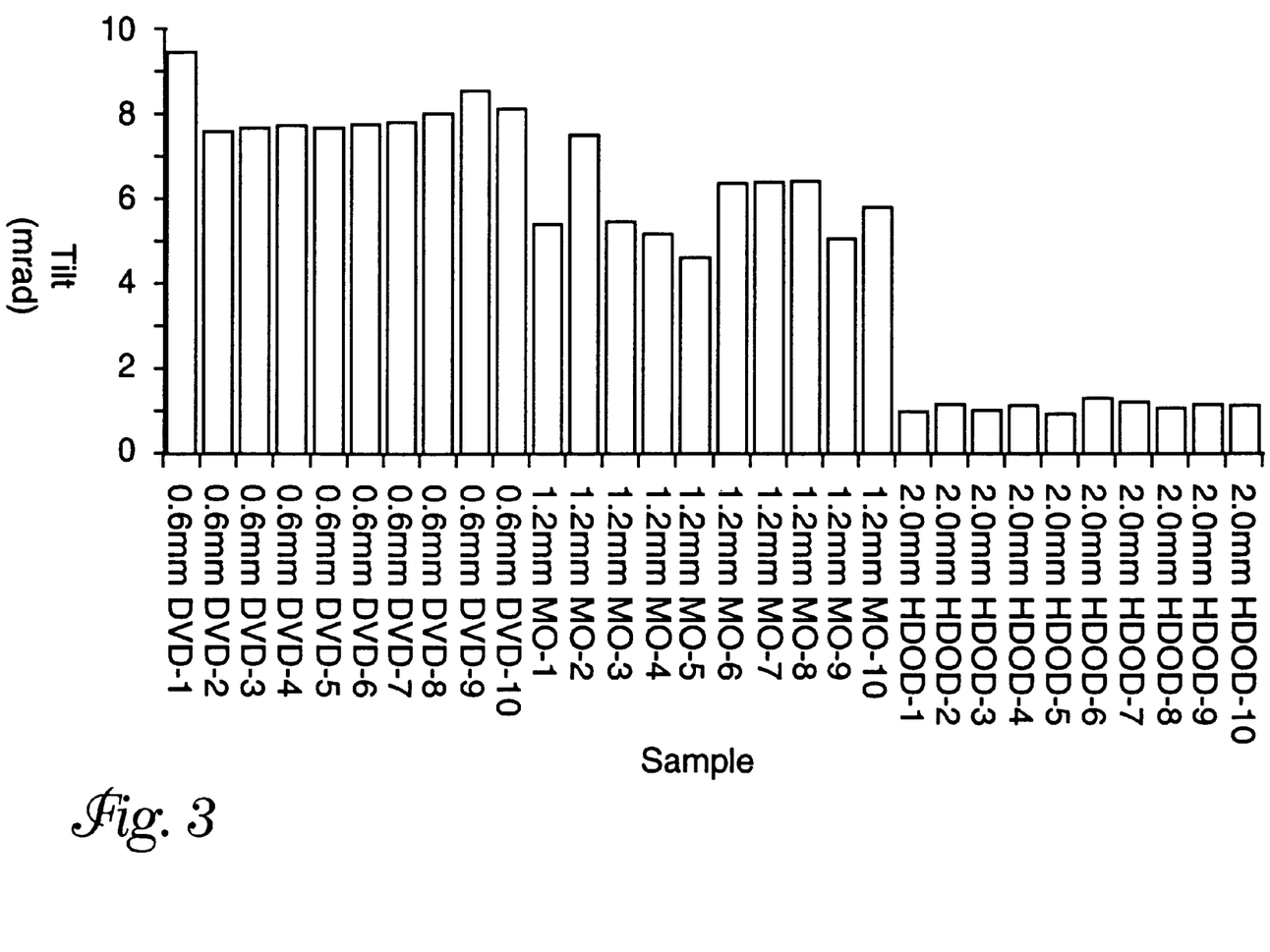
FIG. 3 is a bar graph illustrating variation in process-induced tilt for disks having different substrate thicknesses.

FIG. 3 is a bar graph illustrating variation in process-induced tilt for disks having different substrate thicknesses. Tilt is one of the factors contributing to the overall flatness characteristic of a disk, i.e., the conformance of the beam-incident surface of the disk to the recording plane on which the write beam is focused. The effects of gravity and unbalanced thermal gradients during the post-mold cooling phase can cause uneven densification of different areas of the disks, producing disk warpage and tilt. Tilt refers to the angular variation of the disk surface relative to a plane that is tangential with the center of the disk. Thus, for a warped disk, tilt can vary across the disk radius. As shown in FIG. 3, a number of disk samples having different substrate thicknesses were analyzed to determine tilt in milli-radians (mrad). The samples are represented along the horizontal axis of the graph of FIG. 3, whereas tilt in mrad is shown along the vertical axis.

As indicated in the graph of FIG. 3, a first set of disk samples consisted of ten conventional DVD disks, each having a substrate thickness of 0.6 mm. Each DVD disk was a 4.7 gigabyte (GB) disk having a diameter of 120 mm. Such DVD disks are commercially available from Imation Enterprises Corp., Oakdale, Minn., U.S.A. A second set of disk samples consisted of ten conventional MO disks, each having a substrate thickness of 1.2 mm. Each MO disk was a 1.3 GB disk having a diameter of 130 mm. Such MO disks are also commercially available from Imation Enterprises Corp., Oakdale, Minn., U.S.A. Finally, the third set of disk samples consisted of ten specially prepared MO disks, each having a substrate thickness of approximately 2 mm in accordance with an embodiment in the present invention. Each of the specially prepared MO disks had a diameter of 130 mm, and conceivably could be used with near-field recording techniques to achieve data storage densities on the order of 10 to 20 GB. The substrate for each of the specially prepared MO disks was molded in manner similar to that used for conventional optical disks. In particular, each substrate was molded in a mid-sized 30–100 ton injection molding press that has tooling to make a single substrate per cycle.

With reference to FIG. 3, the MO disks having a substrate thickness of approximately 2 mm produced significantly improved tilt characteristics. Tilt was measured as the maximum tilt over a sampling of radial and angular positions along the disk. The tilt measurement was obtained by using a laser-scanned sensor array that logged vertical displacement of the disk surface for a single rotation of the disk. By radially translating the scanner and sensor array, tilt at a full range of radii was mapped. As a result, the disk can be described by a function $f(r,\theta)$, where r is disk radius and $\theta$ is angular position. Axial displacement was defined as the maximum absolute value of z or maximum deviation of the disk surface from the testing datum over the entire surface. Axial runout is the largest circumferential peak-to-peak value of z, i.e., $max(z)-min(z)$ on a particular radius, found among all radii tested. Tilt is defined as a vector quantity, T, of the first derivative of the function that describes the disk surface, and includes a radial and tangential component. With this background, tilt provides a useful indication of overall disk flatness.

As shown in FIG. 3, whereas the DVD disks and MO disks produced maximum tilt ranging from approximately 5 to 9.5 mrad, the "thick-substrate" MO disks of the present invention produced maximum tilt on the order of 1 to 1.5 mrad. The reduced tilt produced in the disks having a substrate with a thickness of approximately 2 mm is one significant factor in providing improved flatness. Specifically, with lesser tilt, the surface of disk 10 better conforms to the recording plane on which the evanescently coupled beam is focused. In other words, the flatter disk surface contributes to a more consistent air gap thickness between the recording head and the surface of the disk. The air gap thickness determines the focal plane of the beam, and the amount of radiation transmitted by evanescent coupling. By reducing variation in air gap thickness, the write beam can more consistently resolve domains of increasingly smaller size. This feature is particularly useful for the aggressive spatial resolution requirements of near-field recording. With a 130 mm disk, for example, a storage density requirement of approximately 20 GB will require a spatial resolution of approximately 0.0525 square microns. Accordingly, elimination of substantial air gap-induced focusing error is a critical performance factor. Following measurement of tilt, the degree of warpage can be characterized in terms of the difference between maximum and minimum tilt over the disk. In light of the significantly reduced maximum tilt measurement obtained from the specially prepared disks, as shown in FIG. 3, it is reasonable to characterize such disks as also exhibiting significantly reduced warpage.

Figure 4:
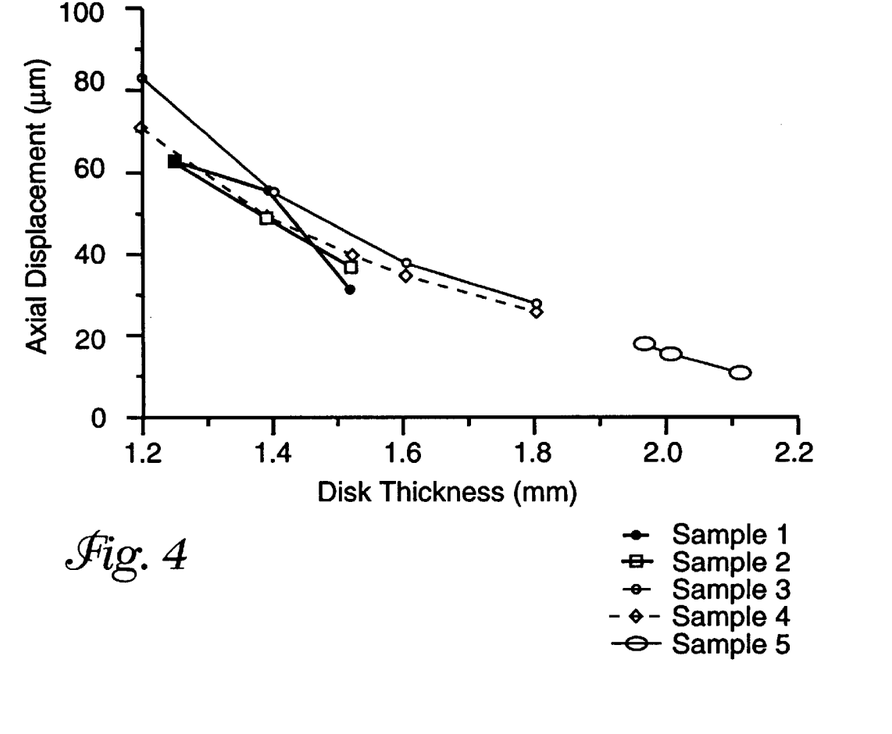
FIG. 4 is a graph illustrating variation in deflection for disks having different substrate thicknesses.

FIG. 4 is a graph illustrating variation in deflection for disks having different substrate thicknesses. Deflection is another significant factor in the overall flatness characteristic of a disk. In particular, the disk can be susceptible to deflection in response to forces encountered during drive operation. Such forces may result, for example, from inadvertent contact of the head with the disk surface or vibration induced by rotation of the disk. Head crashes can result, in particular, from the application of shock loads when the disk and drive system are bumped or dropped. Also, for flight during operation, the head exerts pressure against the air bearing. This bearing pressure is transferred to the disk, and can cause disk deflection. Deflection generally varies across the surface area of the disk. In particular, deflection during use can be more pronounced at the outer diameter of the disk. The disk is held in a relatively fixed manner by a clutch mechanism associated with the drive. This disk is rotated by a spindle motor associated with the clutch mechanism. The radii of the disk plane form beam members relative to the fixed center of the disk. Each beam member undergoes greater deflection at the outer diameter than at the inner diameter of the disk. Thus, deviation of the disk surface from the recording plane can progressively increase from the inner diameter outward. As a result, the disk surface may not conform closely to the recording plane as it is rotated.

The graph of FIG. 4 shows deflection data for several actual disks and substrates, as well as disks and substrates represented by finite element modeling. Specifically, with reference to FIG. 4, deflection data was obtained for the following sets of samples: sample set 1—bare (uncoated) polycarbonate substrates having thicknesses ranging from approximately 1.24 to 1.52 mm; sample set 2—coated (with recording layer, reflector, and dielectrics) polycarbonate substrates having thicknesses ranging from approximately 1.24 to 1.52 mm; and sample set 5—bare (uncoated) polycarbonate substrates having thicknesses ranging from approximately 1.95 to 2.1 mm. The polycarbonate substrates in sample sets 1, 2, and 5 were formed from high-flow, CD grade polycarbonate obtained from Mitsubishi Gas & Chemical Co. Deflection data was also modeled for the following sets of samples analyzed by finite element modeling: sample set 3—bare (uncoated) polycarbonate substrates having thicknesses ranging from approximately 1.2 to 1.8 mm; and sample set 4—coated (with recording layer, reflector, and dielectrics) polycarbonate substrates having thicknesses ranging from approximately 1.2 to 1.8 mm.

Each sample, actual and modeled, had a radius of 130 mm. The deflection data was represented as axial displacement in microns (Tm) relative to an initial, unloaded position. To obtain the deflection data, each sample was loaded with a force of approximately 5 grams force (gf) at a radius from disk center of approximately 60 mm. The loading force is approximately equivalent to the air bearing forces expected to be exerted against the disk during operation in an air-incident, near-field recording application. Displacement of the sample at the 60 mm radius was then measured from its initial, unloaded position to the loaded position. This disk was not rotated during measurement. However, this static measurement is believed to provide a reasonable analog to the measurements that would be obtained during rotation. This displacement measurement provided an indication of relative deflection of each sample. As illustrated by the graph of FIG. 4, the displacement data suggest a rapid decrease in disk deflection as substrate thickness is increased from approximately 1.2 mm to approximately 2.1 mm. In particular, a bare polycarbonate disk having a thickness of approximately 1.24 mm was observed to produce displacement of approximately 62 microns. In contrast, a bare polycarbonate disk having a thickness of approximately 2.0 mm was observed to produce a displacement of approximately 28 microns.

Based on the data represented in the graph of FIG. 4, it is evident that a disk having a thicker substrate can provide a clear advantage in resisting operationally-induced deflection in the drive. This resistance to deflection, or "stiffness," is critical in ensuring consistent conformance of the incident surface of the disk to the recording plane. The deflection data also support the theoretical case for a disk substrate of increased thickness. Specifically, according to principles of mechanics, stiffness of a beam member is proportional to the elastic modulus of the material and the width of the beam. Stiffness is also a function, however, of the cube of the thickness. Thus, substrate thickness is the most powerful factor in controlling deflection. In accordance with the present invention, this characteristic of a thicker substrate is exploited to improve the flatness characteristic of the disk, and ultimately contribute to increased spatial density for recording. In particular, greater disk stiffness improves the consistency of air gap thickness across the surface of the disk. More consistent air gap thickness enhances the ability of the drive to focus on increasingly smaller domains on the disk.

Although increased substrate thickness is generally desirable from a disk performance standpoint, it may be constrained by certain size, weight, and fabrication process considerations. Specifically, significantly increased substrate thickness can lead to a disk having excessive size and weight. Excessive size and weight can undermine interests in portability and ergonomics. Also, excessive size and weight can increase the torque, power consumption, and space requirements of the drive. In particular, excessive weight results in a disk having greater inertia and momentum, slowing spin-up and spin-down times and increasing access time by the drive. Further, greater substrate thickness can drive up the cost of materials used in the fabrication process, as well as the process time necessary for disk fabrication. With a polycarbonate or other plastic substrate, for example, the substrate is molded and allowed to cool. With increased thicknesses, the post-mold cooling process may take longer.

Figure 5:
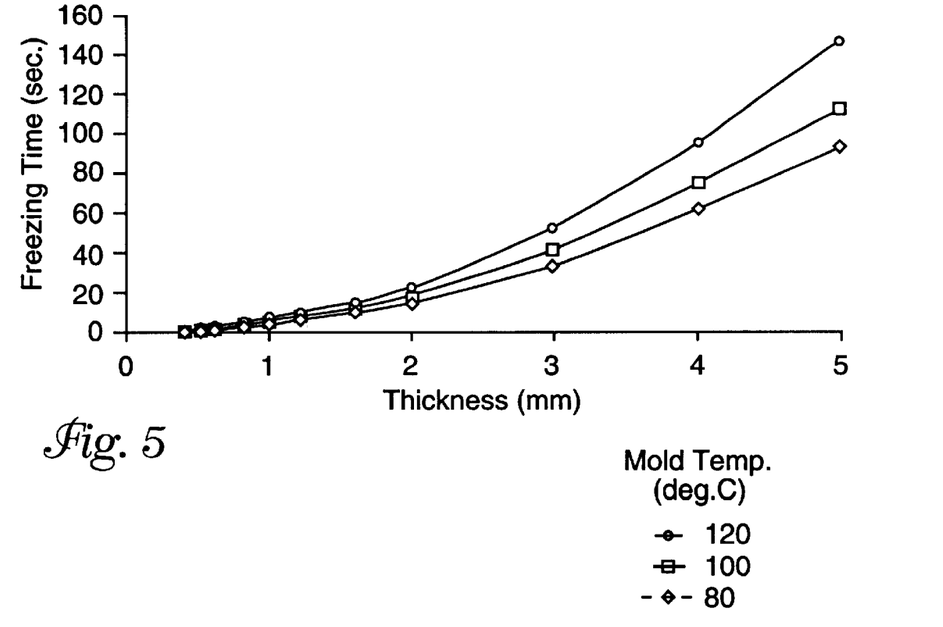
FIG. 5 is a graph illustrating variation in required cooling time for disks molded with different substrate thicknesses.

FIG. 5 is a graph illustrating variation in cooling time for disks molded with different substrate thicknesses. FIG. 5 shows simple finite-difference results for freezing time for the midline of a disk where one-dimensional (out-of-plane) conduction dominates. The governing equation for one-dimensional transient heat conduction is as follows:

$$dT/dt = (\partial^2 T/\partial z^2)$$

where T is temperature in Kelvins, t is time, z is thickness dimension, and is the coefficient of thermal diffusivity. This equation is first order in time and second order in the spatial direction. Consequently, a change in substrate thickness will require an increase in post-mold cooling time that is proportional to the square of the thickness change. In FIG. 5, the equations are solved for conditions appropriate for polycarbonate injected into a mold at 340 degrees C., and held in contact with the metal mold surfaces at 80, 100, and 120 degrees C. As shown in FIG. 5, disk substrate thicknesses on the order of 2 mm are expected to cool to solid state in less than twenty seconds. At substrate thicknesses above 2.5 mm, however, cooling time exceeds twenty seconds and increases at a greater rate with increased thickness. The key conclusion to be drawn from the data in FIG. 5 is that the required cooling time rises considerably as the substrate thickness is increased above 2.5 mm. Of course, this increased cooling time can reduce fabrication process throughput, possibly requiring additional mold stations and associated capital expenditures for desired production levels.

In view of the tilt and deflection data of FIGS. 3 and 4 and the process data of FIG. 5, the limits for substrate thickness are generally performance-based on the lower end and process-based on the upper end. The upper end is also influenced by the cost, size, and weight of the disk and drive. Thus, a balance is necessary. In accordance with the present invention, it is desirable that the substrate have a thickness of greater than or equal to approximately 1.5 mm to facilitate adequate stiffness to limit deflection and vibration problems. A substrate having a thickness that is greater than or equal to approximately 1.5 mm is also desirable to avoid significant warpage and tilt. To allow feasible processing time, as well as reasonable cost, size and weight of the disk and drive, however, it is desirable that the thickness of the substrate be less than or equal to approximately 2.5 mm. In a preferred embodiment, this balance can be achieved such that the substrate thickness is greater than or equal to approximately 1.8 mm and less than or equal to approximately 2.2 mm. With a substrate thickness in this preferred range, satisfactory disk flatness has been observed without producing excessive processing time or significantly driving up the material cost, size, and weight of the disk and drive. More preferably, the substrate has a thickness of greater than or equal to approximately 1.9 mm and less than or equal to approximately 2.1 mm, and may have a thickness of approximately 2 mm. This thickness range has been observed to be particularly advantageous for a disk having a diameter in the range of approximately 120 to 135 mm. Given maximum disk and drive size limitations and storage density requirements, this disk diameter range appears most feasible for presently contemplated near field recording applications.

The foregoing detailed description has been provided for a better understanding of the invention and is for exemplary purposes only. Modifications may be apparent to those skilled in the art without deviating from the spirit and scope of the appended claims. For example, although the enhanced flatness provided by the present invention may be particularly desirable for magneto-optic disks useful in near-field, air-incident recording, application to other optical disks such as phase-change, CD-R, or substrate incident magneto-optic disks is contemplated.

What is claimed is:

1. A rewritable optical data storage disk comprising a substrate and a recording layer, wherein the substrate has a thickness of greater than or equal to approximately 1.5 mm.

2. The disk of claim 1, wherein the disk is a magneto-optic disk and the recording layer comprises a magneto-optic recording material.

3. The disk of claim 1, wherein the thickness of the substrate is less than or equal to approximately 2.5 mm.

4. The disk of claim 1, wherein the thickness of the substrate is greater than or equal to approximately 1.8 mm and less than or equal to approximately 2.2 mm.

5. The disk of claim 1, wherein the thickness of the substrate is greater than or equal to approximately 1.9 mm and less than or equal to approximately 2.1 mm.

6. The disk of claim 1, wherein the thickness of the substrate is approximately 2 mm.

7. The disk of claim 1, wherein the disk has a diameter of greater than or equal to approximately 120 mm and less than or equal to approximately 135 mm.

8. The disk of claim 1, wherein the disk has a diameter of approximately 130 mm.

9. The disk of claim 1, wherein the substrate comprises a material selected from the group consisting of thermoset, thermoplastic, glass, and metal.

10. The disk of claim 1, wherein the substrate comprises polycarbonate material.

11. The disk of claim 1, further comprising a reflective layer, a first dielectric layer and a second dielectric layer, wherein the first and second dielectric layers are disposed adjacent opposite sides of the recording layer.

12. The disk of claim 1, wherein the disk is capable of forming stable magnetizable domains having dimensions of less than or equal to approximately 0.06 square microns.

13. The disk of claim 1, wherein the substrate and recording layer include a central hole having a diameter of approximately 15 mm.

14. An air-incident, magneto-optic disk comprising in order:

a substrate;

a reflective layer;

a first dielectric layer;

a recording layer; and a second dielectric layer, wherein the substrate has a thickness of greater than or equal to approximately 1.5 mm.

15. The disk of claim 14, wherein the thickness of the substrate is less than or equal to approximately 2.5 mm.

16. The disk of claim 14, wherein the thickness of the substrate is greater than or equal to approximately 1.8 mm and less than or equal to approximately 2.2 mm.

17. The disk of claim 14, wherein the thickness of the substrate is greater than or equal to approximately 1.9 mm and less than or equal to approximately 2.1 mm.

18. The disk of claim 14, wherein the thickness of the substrate is approximately 2 mm.

19. The disk of claim 14, wherein the disk has a diameter of greater than or equal to approximately 120 mm and less than or equal to approximately 135 mm.

20. The disk of claim 14, wherein the disk has a diameter of approximately 130 mm.

21. The disk of claim 14, wherein the substrate comprises a material selected from the group consisting of thermoset, thermoplastic, glass, and metal.

22. The disk of claim 14, wherein the substrate comprises polycarbonate material.

23. The disk of claim 14, wherein the disk is capable of forming stable magnetizable domains having dimensions of less than approximately 0.06 square microns.

24. The disk of claim 14, wherein the disk includes a central hole having a diameter of approximately 15 mm.

25. An air-incident, magneto-optic disk comprising in order:

a substrate having a thickness of greater than or equal to approximately 1.5 mm and less than or equal to approximately 2.5 mm;

a reflective layer;

a first dielectric layer;

a recording layer having a thickness of greater than or equal to approximately 6 nm and less than or equal to approximately 15 nm; and a second dielectric layer, wherein the disk has a diameter of approximately 130 mm and is capable of forming stable magnetizable domains having dimensions of less than approximately 0.06 square microns.

26. The disk of claim 25, wherein the substrate has a thickness of greater than or equal to approximately 1.8 mm and less than or equal to approximately 2.2 mm.

27. A method for making an air-incident, magneto-optic disk comprising:

forming a substrate having a thickness of greater than or equal to approximately 1.5 mm;

forming a reflective layer over the substrate;

forming a first dielectric layer over the reflective layer;

forming a recording layer over the first dielectric layer; and forming a second dielectric layer over the recording layer.

28. The method of claim 27, wherein the thickness of the substrate is less than or equal to approximately 2.5 mm.

29. The method of claim 27, wherein the thickness of the substrate is greater than or equal to approximately 1.8 mm and less than or equal to approximately 2.2 mm.

30. The method of claim 27, wherein the thickness of the substrate is greater than or equal to approximately 1.9 mm and less than or equal to approximately 2.1 mm.

31. The method of claim 27, wherein the thickness of the substrate is approximately 2 mm.

\* \* \* \* \*

UNITED STATES PATENT AND TRADEMARK OFFICE
CERTIFICATE OF CORRECTION

PATENT NO.: 5,972,461

DATED: October 26, 1999

INVENTOR(S): Chad R. Sandstrom

It is certified that error appears in the above-identified patent and that said Letters Patent is hereby corrected as shown below:

Column 7, line 19, "thermoplastic. this" should read --thermoplastic. This--.

Column 12, line 10, "dT/dt = $(\partial^2 T/\partial z^2)$" should read --dT/dt = $\propto(\partial^2 T/\partial z^2)$--.

Column 12, line 12, "and is" should read --and $\propto$ is--.

Signed and Sealed this

Third Day of April, 2001

*Attest:*

NICHOLAS P. GODICI

*Attesting Officer*   Acting Director of the United States Patent and Trademark Office